US008457883B2

(12) United States Patent
Chen et al.

(10) Patent No.: US 8,457,883 B2
(45) Date of Patent: Jun. 4, 2013

(54) NAVIGATION SYSTEM WITH CALENDAR MECHANISM AND METHOD OF OPERATION THEREOF

(75) Inventors: Hong Chen, San Jose, CA (US); HaiPing Jin, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 139 days.

(21) Appl. No.: 12/763,358

(22) Filed: Apr. 20, 2010

(65) Prior Publication Data

US 2011/0257881 A1 Oct. 20, 2011

(51) Int. Cl.
*G01C 21/00* (2006.01)
(52) U.S. Cl.
USPC .......................................... 701/423
(58) Field of Classification Search
USPC .................................. 701/204, 423
See application file for complete search history.

(56) References Cited

U.S. PATENT DOCUMENTS

| | | | |
|---|---|---|---|
| 6,816,778 B2 | 11/2004 | Diaz | |
| 7,869,941 B2 * | 1/2011 | Coughlin et al. | 701/533 |
| 2002/0055844 A1 | 5/2002 | L'Esperance et al. | |
| 2003/0004776 A1 * | 1/2003 | Perrella et al. | 705/9 |
| 2007/0226035 A1 | 9/2007 | Doss et al. | |
| 2007/0250257 A1 * | 10/2007 | Almy | 701/200 |
| 2007/0260972 A1 | 11/2007 | Anderl | |
| 2008/0114638 A1 * | 5/2008 | Colliau et al. | 705/9 |
| 2008/0167938 A1 * | 7/2008 | Meisels et al. | 705/9 |
| 2009/0177503 A1 | 7/2009 | Kawano et al. | |
| 2011/0125545 A1 * | 5/2011 | Lehmann et al. | 705/7.24 |
| 2011/0130958 A1 * | 6/2011 | Stahl et al. | 701/201 |
| 2011/0252097 A1 * | 10/2011 | Walker et al. | 709/206 |
| 2011/0257881 A1 * | 10/2011 | Chen et al. | 701/204 |

OTHER PUBLICATIONS

International Search Report for Application No. PCT/US2011/032933 dated Jun. 22, 2011.

* cited by examiner

*Primary Examiner* — James Trammell
*Assistant Examiner* — Michael D Lang

(57) ABSTRACT

A method of operation of a navigation system includes: sending a meeting proposal to a participant calendar with the meeting proposal having a meeting location and a meeting start time; determining a prior location from the participant calendar; calculating a participant travel time for traversing between the prior location and the meeting location; and scheduling the meeting proposal on the participant calendar based on the participant travel time not exceeding the meeting start time for displaying on a device.

20 Claims, 8 Drawing Sheets

NAVIGATION SYSTEM WITH CALENDAR MECHANISM AND METHOD OF OPERATION THEREOF

TECHNICAL FIELD

The present invention relates generally to a navigation system and more particularly to a system for navigation system with calendar mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services, such as a global positioning system (GPS), for a car or on a mobile device, such as a cell phone, portable navigation device (PND) or a personal digital assistant (PDA).

Location based services allow users to create, transfer, store, and/or consume information in order for users to create, transfer, store, and consume in the "real world". One such use of location based services is efficiently and realistically scheduling events and meetings on the user's calendar.

However, personal calendars that fail to incorporate changes or fail to detect unreasonable burdens for the user have become a paramount concern for consumers. Calendars often schedule meetings and events too close in time and do not adjust to changes, thus remaining inefficient.

Thus, a need still remains for a navigation system that can schedule meetings and events with reasonable time gaps and update the personal calendar with more accuracy. In view of increasing demand for better time management, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: sending a meeting proposal to a participant calendar with the meeting proposal having a meeting location and a meeting start time; determining a prior location from the participant calendar; calculating a participant travel time for traversing between the prior location and the meeting location; and scheduling the meeting proposal on the participant calendar based on the participant travel time not exceeding the meeting start time for displaying on a device.

The present invention provides a navigation system including: a calendar scheduler module for sending a meeting proposal to a participant calendar with the meeting proposal having a meeting location and a meeting start time; a calendar checker module, coupled to the calendar scheduler module, for determining a prior location from the participant calendar; a travel-time calculation module, coupled to the calendar checker module, for calculating a participant travel time for traversing between the prior location and the meeting location; and a conflict checker module, coupled to the travel-time calculation module, for scheduling the meeting proposal on the participant calendar based on the participant travel time not exceeding the meeting start time for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
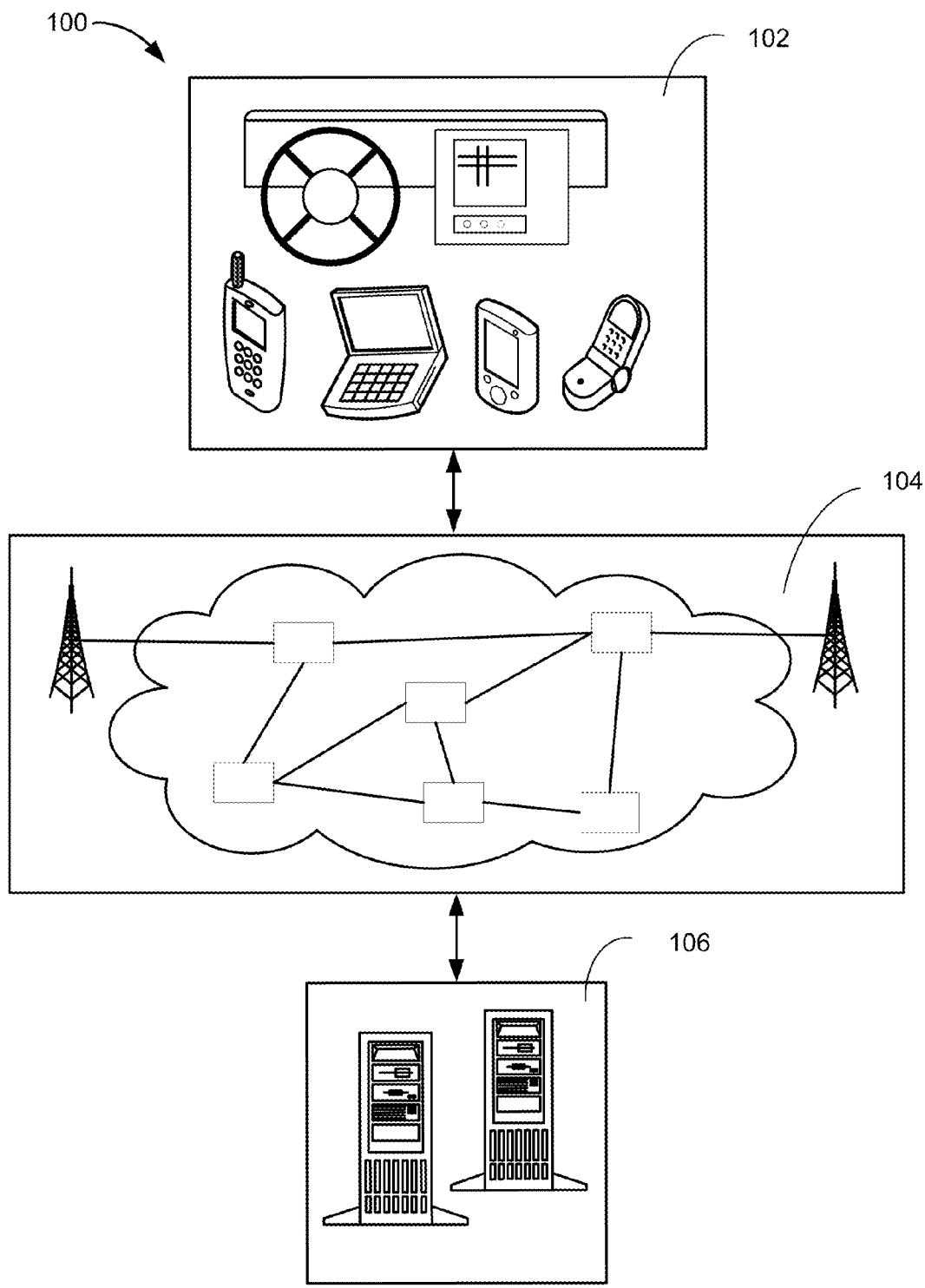
FIG. 1 is a navigation system with calendar mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with calendar mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
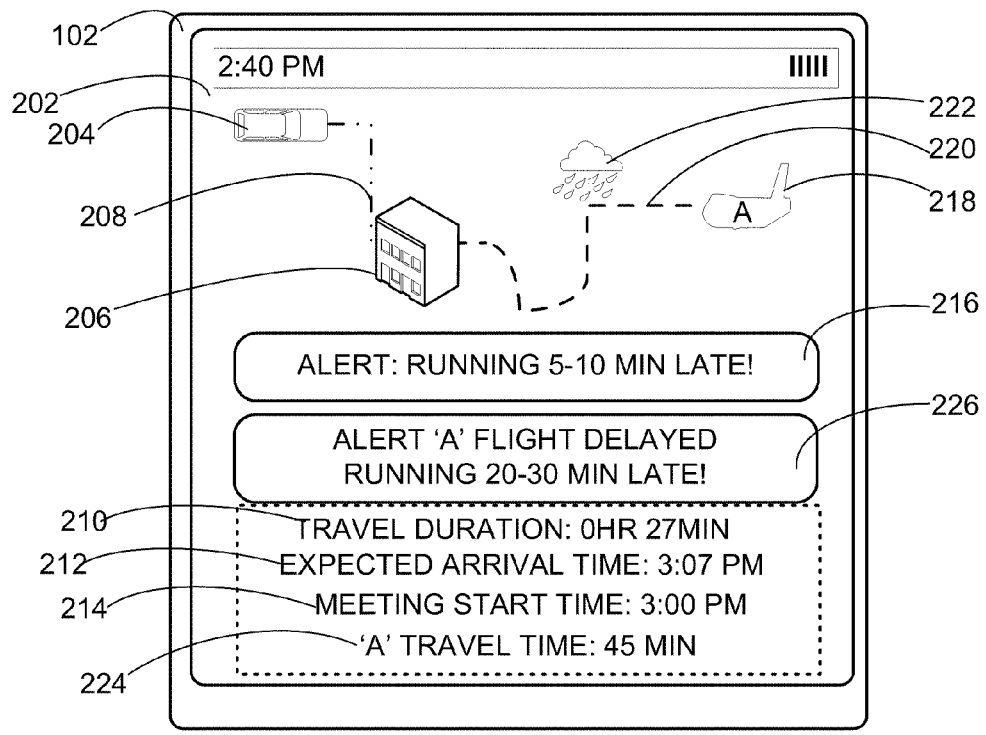
FIG. 2 is a first example of a display interface of the first device.

Referring now to FIG. 2, therein is shown a first example of a display interface 202 of the first device 102. The display interface 202 can show a current location 204 of a user, a meeting location 206, and an arrival route 208 for traveling from the current location 204 to the meeting location 206.

The current location 204 represents the physical location of the first device 102. The meeting location 206 represents the physical location where the meeting is being held. For example, both the current location 204 and the meeting location 206 can be represented with a postal address, names of an intersection, a name of the physical location, such as Madison Square Garden, or a combination thereof.

The arrival route 208 represents the route for the user to traverse from the current location 204 to the meeting location 206. For example, the arrival route 208 can include a terrestrial route, a water route, an air route, or a combination thereof.

A travel duration 210 represents the estimated time required for the user to arrive at the meeting location 206. Details of calculating the travel duration 210 will be discussed below.

An arrival time 212 represents the estimated time for the user's arrival at the meeting location 206. The arrival time 212 can be calculated by adding the travel duration 210 to the current time. For example, when the arrival time 212 is 27 minutes and the current time is 2:40 pm, the arrival time 212 can be 3:07 pm. The arrival time 212 can also take into account the travel itinerary of any scheduled transportation, such as flights, trains, or buses. The arrival time 212 can also take into account other scheduled events or meeting prior to the meeting at the meeting location 206.

A meeting start time 214 represents the designated starting time for the meeting at the meeting location 206. A relative arrival time 216 represents the difference in time between the user's estimated arrival time at the meeting location 206 and the meeting start time 214. The relative arrival time 216 can be the difference in time between the arrival time 212 and the meeting start time 214. For example, when the arrival time 212 is 3:07 pm and the meeting time is 3:00 pm the relative arrival time 216 can be 7 minutes.

The display interface 202 can also depict a participant's location 218 of a remote participant, a participant's travel route 220, and a travel condition 222 of the participant's travel route 220. The participant's location 218 represents a current physical location of the remote participant. The participant's travel route 220 can represent the route the remote participant can travel to get to the meeting location 206. The participant's travel route 220 will be discussed in more detail below.

The travel condition 222 can represent the environmental condition of the participant's travel route 220. For example, the travel condition 222 can include storms for the participant's travel route 220 as a water route. The travel condition 222 can include can include traffic accidents for the participant's travel route 220 as a terrestrial route.

A participant travel time 224 represents the time required for a remote participant to arrive at the meeting location 206. Details and examples of calculating the participant travel time 224 will be discussed below.

A participant status 226 represents the status related to the remote participant's journey. For example, the participant status 226 can include whether the remote participant has departed on time, or there is a two hour flight delay in the participant's travel route 220.

Figure 3:
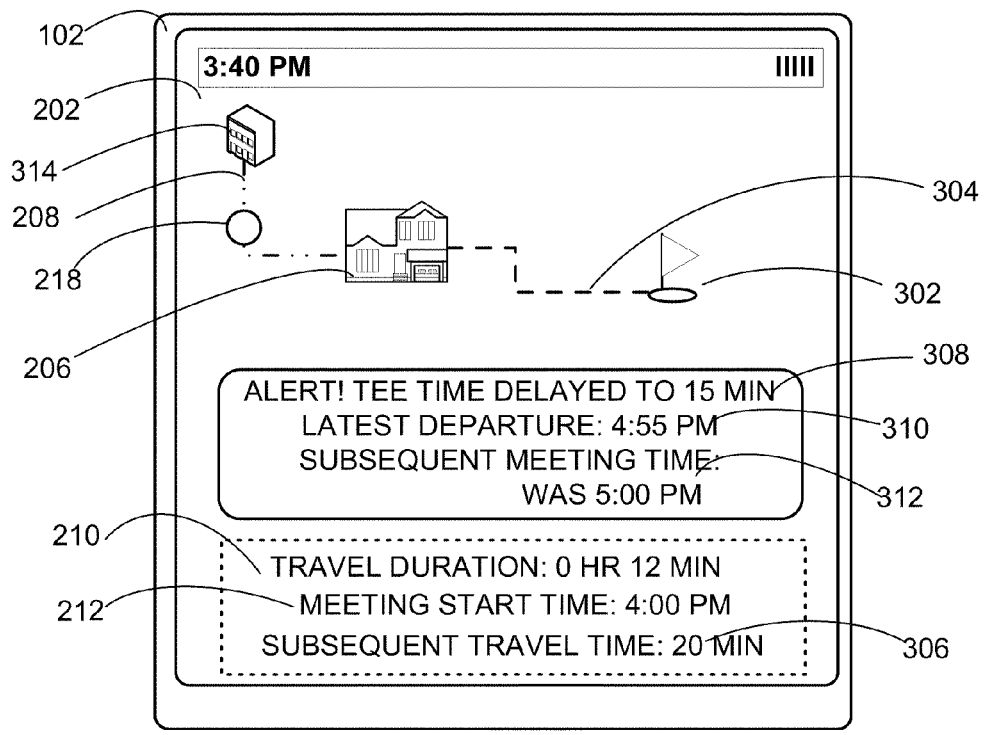
FIG. 3 is a second example of the display interface.

Referring now to FIG. 3, therein is shown a second example of the display interface 202. The display interface 202 can show a subsequent location 302 and an exit route 304 from the meeting location 206 to the subsequent location 302.

The subsequent location 302 represents a location the remote participant needs to travel to after the meeting at the meeting location 206. For example, a golf course can be the subsequent location 302 for a scheduled tee time occurring about two hours later. Another example is the remote participant may travel back to where he or she came from to attend the meeting.

The exit route 304 can represent a route for the remote participant to travel from the meeting location 206 to the subsequent location 302. For example, the exit route 304 of the remote participant can include a terrestrial route, a water route, an air route, or a combination thereof.

A subsequent travel time 306 represents the time required to traverse along the exit route 304 for arriving at the subsequent location 302. A subsequent meeting update 308 can provide external factors that can affect the subsequent travel time 306 or the subsequent meeting itself. Details and examples of calculating the subsequent travel time 306 and the subsequent meeting update 308 will be discussed below.

A latest departure time 310 represents the latest time the user will have to depart to arrive at the subsequent location 302 before a subsequent meeting time 312 associated with the subsequent location 302. The subsequent meeting time 312 can be the designated start time for the next scheduled meeting.

The latest departure time 310 can be calculated based on the subsequent travel time 306 and the subsequent meeting time 312. Details and examples of calculating the latest departure time 310 will be discussed below.

A prior location 314 represents the known location of the remote participant prior to a certain time. For example, if the remote participant is heading home from work, then to the golf course, remote participant's place of employment could be the prior location 314. Furthermore, the golf course in the example could be the subsequent location 302.

The prior location 314, the meeting location 206 and the subsequent location 302 can each represent different locations at different times. For example, the prior location 314, the meeting location 206 and the subsequent location 302 can change when a meeting or event finishes.

If the remote participant is going home from work and then to the golf course, the prior location 314 can be the remote participant's place of employment, the meeting location 206 can be the remote participant's house, and the subsequent location 302 can be the golf course. Once the remote participant leaves the house, the prior location 314 can change from work to the house, the meeting location 206 can change from the house to the golf course, and the subsequent location 302 can change from the golf course to the scheduled event following the golf game.

Figure 4:
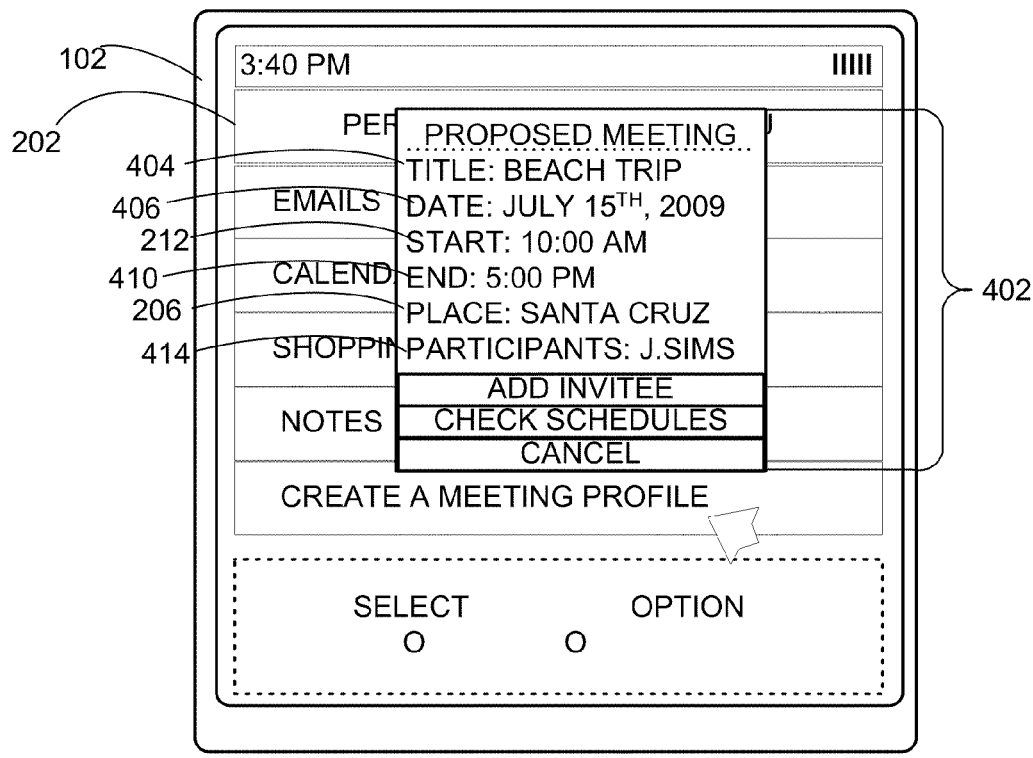
FIG. 4 is a third example of the display interface.

Referring now to FIG. 4, therein is shown a third example of the display interface 202. The display interface 202 can depict a meeting proposal 402. The meeting proposal 402 can include a meeting title 404 and select a meeting date 406, the meeting start time 214, a meeting end time 410, the meeting location 206, a remote participant 414, or a combination thereof.

The meeting proposal 402 represents a request to meet with people or a suggestion to visit a location. For example, the meeting proposal 402 can be the user's request for meeting with a customer at a job site, request for visiting a particular zoo, or a reminder to himself or herself for shopping at a grocery store on the way home.

The meeting title 404 represents the name given to the meeting or the purpose of the meeting. The meeting date 406 and the meeting start time 214 designates when the meeting will start; the meeting end time 410 can designate when the meeting will finish. The remote participant 414 represents a participant for the meeting.

Figure 5:
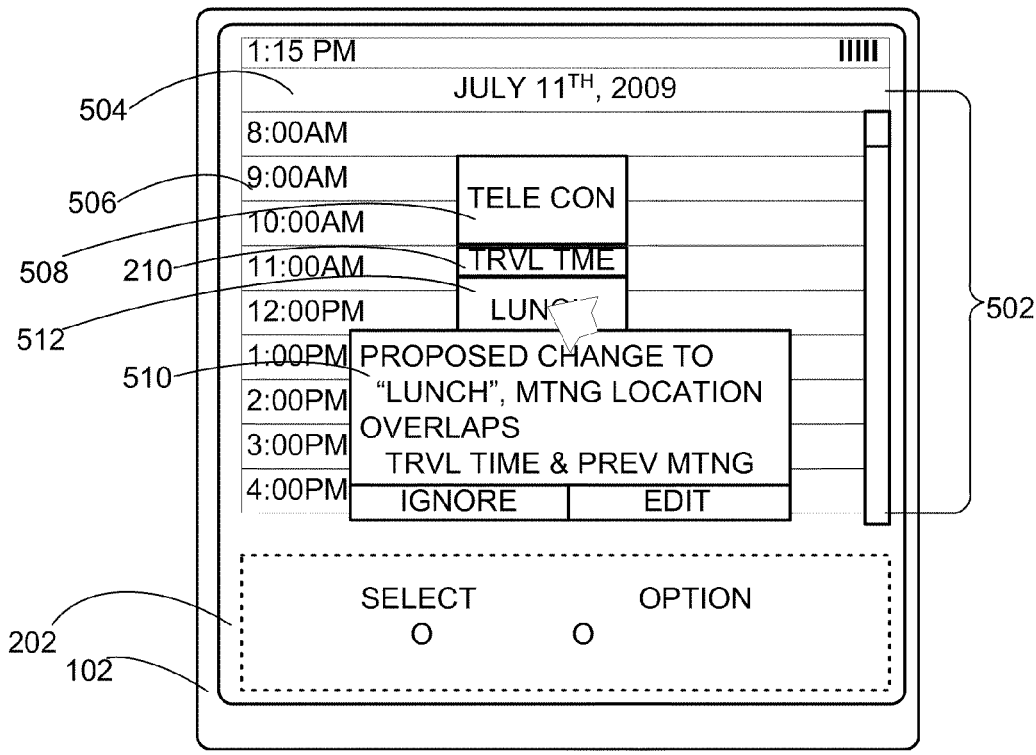
FIG. 5 is a fourth example of the display interface.

Referring now to FIG. 5, therein is shown a fourth example of the display interface 202. The navigation system 100 can have a participant calendar 502. The participant calendar 502 can be a representation of time and can include a calendar date 504 and time segments 506. For example, the participant calendar 502 can be an electronic calendar, such as Microsoft Outlook™ or a tide schedule booklet.

The participant calendar 502 can include a calendar event 508. The calendar event 508 can be a block of time that is reserved on the participant calendar 502. For example, the calendar event 508 can be a 2:00 pm to 3:00 pm teleconference with a customer or a nine-to-five work day. The calendar event 508 can further include the meeting proposal 402 of FIG. 4 that has been accepted by the remote participant 414 of FIG. 4 specified in the meeting proposal 402. The calendar event 508 can represent any number or types of appointments on the participant calendar 502 and can be different from one another.

The participant calendar 502 can also include the travel duration 210. The travel duration 210 to arrive at the calendar event 508 can be located right before the calendar event 508.

For example, a 15 minute walk required to get to an 8:00 am class can be positioned on the calendar between 7:45 am and 8:00 am.

The participant calendar 502 can provide a calendar warning 510. The calendar warning 510 can be given when the user changes portions of the calendar event 508 and the change conflicts with other calendar events or the travel duration 210. For example, a change in the meeting location 206 of FIG. 2 for a lunch meeting or a rescheduled doctor's appointment can conflict with the calendar event, such as a faculty meeting, occurring before and after the changed calendar event.

The participant calendar 502 can include a subsequent calendar event 512. The subsequent calendar event 512 is an example of the calendar event 508 that starts after a specific reference time. For example, the subsequent calendar event 512 can be the calendar event 508 that occurs after an arbitrary time, such as 11:00 AM or sunrise, or after the meeting start time 214 of FIG. 4 as contained in the meeting proposal 402 of FIG. 4. Also, for example, the subsequent calendar event 512 can be the 11:30 AM lunch appointment occurring after the 9:00 AM telephone conference.

Conflict can exist when a change to the calendar event 508 increases the travel time to be greater than the time gap between two calendar events. Conflict can also exist when a change to the calendar event 508 overlaps another of the calendar event 508. An overlap can exist when the meeting start time 214 of FIG. 2 or the meeting end time 410 of FIG. 4 for the calendar event 508 occurs between the meeting start time 214 and the meeting end time 410 for another calendar event.

Figure 6:
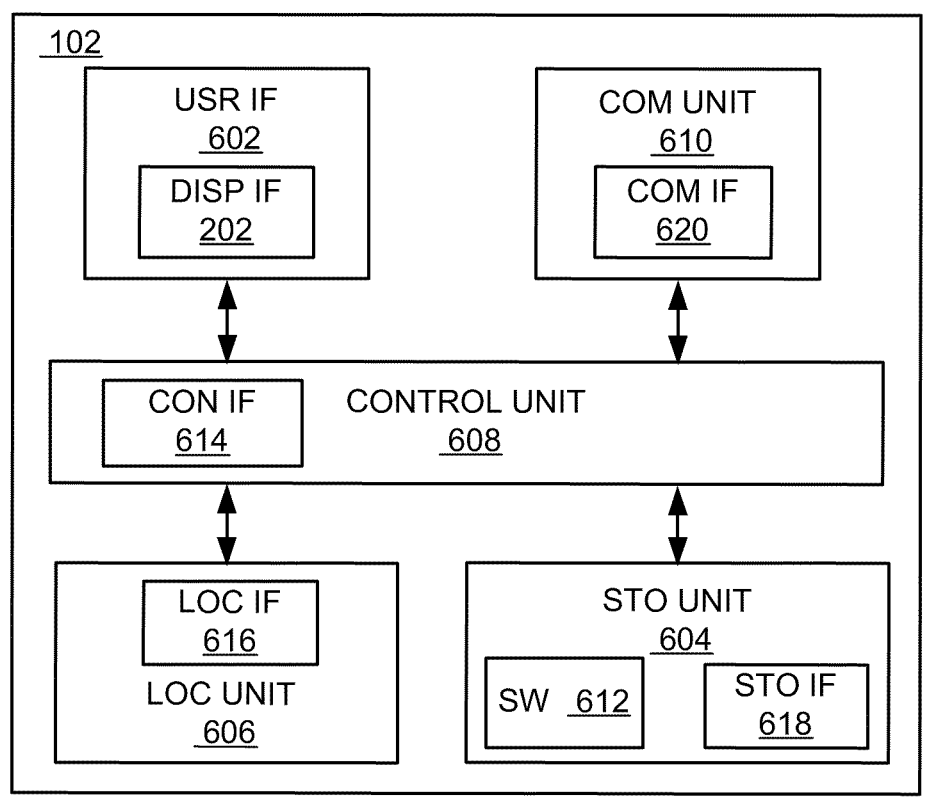
FIG. 6 is an exemplary block diagram of the first device.

Referring now to FIG. 6, therein is shown an exemplary block diagram of the first device 102. The first device 102 can include a user interface 602, a storage unit 604, a location unit 606, a control unit 608, and a communication unit 610.

The user interface 602 allows a user (not shown) to interface and interact with the first device 102. The user interface 602 can include an input device and an output device. Examples of the input device of the user interface 602 can include a keypad, a touchpad, soft-keys, a keyboard, a microphone, or any combination thereof to provide data and communication inputs. Examples of the output device of the user interface 602 can include the display interface 202 of FIG. 2. The display interface 202 can include a display, a projector, a video screen, a speaker, or any combination thereof.

The control unit 608 can execute a software 612 to provide the intelligence of the navigation system 100 of FIG. 1. The control unit 608 can operate the user interface 602 to display information generated by the navigation system 100. The control unit 608 can also execute the software 612 for the other functions of the navigation system 100, including receiving location information from the location unit 606. The control unit 608 can further execute the software 612 for interaction with the communication path 104 of FIG. 1 via the communication unit 610.

The control unit 608 can be implemented in a number of different manners. For example, the control unit 608 can be a processor, an embedded processor, a microprocessor, a hardware control logic, a hardware finite state machine (FSM), a digital signal processor (DSP), or a combination thereof.

The control unit 608 can include a controller interface 614. The controller interface 614 can be used for communication between the control unit 608 and other functional units in the first device 102 of FIG. 1. The controller interface 614 can also be used for communication that is external to the first device 102.

The controller interface 614 can receive information from the other functional units or from external sources, or can transmit information to the other functional units or to external destinations. The external sources and the external destinations refer to sources and destinations external to the first device 102.

The controller interface 614 can be implemented in different ways and can include different implementations depending on which functional units or external units are being interfaced with the controller interface 614. For example, the controller interface 614 can be implemented with a pressure sensor, an inertial sensor, a microelectromechanical system (MEMS), optical circuitry, waveguides, wireless circuitry, wireline circuitry, or a combination thereof.

The location unit 606 can generate location information, current heading, and current speed of the first device 102, as examples. The location unit 606 can be implemented in many ways. For example, the location unit 606 can function as at least a part of a global positioning system (GPS), an inertial navigation system, a cellular-tower location system, a pressure location system, or any combination thereof.

The location unit 606 can include a location interface 616. The location interface 616 can be used for communication between the location unit 606 and other functional units in the first device 102. The location interface 616 can also be used for communication that is external to the first device 102.

The location interface 616 can receive information from the other functional units or from external sources, or can transmit information to the other functional units or to external destinations. The external sources and the external destinations refer to sources and destinations external to the first device 102.

The location interface 616 can include different implementations depending on which functional units or external units are being interfaced with the location unit 606. The location interface 616 can be implemented with technologies and techniques similar to the implementation of the controller interface 614.

The storage unit 604 can store the software 612. The storage unit 604 can also store the relevant information, such as advertisements, points of interest (POI), navigation routing entries, or any combination thereof.

The storage unit 604 can be a volatile memory, a nonvolatile memory, an internal memory, an external memory, or a combination thereof. For example, the storage unit 604 can be a nonvolatile storage such as non-volatile random access memory (NVRAM), Flash memory, disk storage, or a volatile storage such as static random access memory (SRAM).

The storage unit 604 can include a storage interface 618. The storage interface 618 can be used for communication between the location unit 606 and other functional units in the first device 102. The storage interface 618 can also be used for communication that is external to the first device 102.

The storage interface 618 can receive information from the other functional units or from external sources, or can transmit information to the other functional units or to external destinations. The external sources and the external destinations refer to sources and destinations external to the first device 102.

The storage interface 618 can include different implementations depending on which functional units or external units are being interfaced with the storage unit 604. The storage interface 618 can be implemented with technologies and techniques similar to the implementation of the controller interface 614.

The communication unit 610 can enable external communication to and from the first device 102. For example, the communication unit 610 can permit the first device 102 to communicate with the second device 106 of FIG. 1, an attachment, such as a peripheral device or a computer desktop, and the communication path 104 of FIG. 1.

The communication unit 610 can also function as a communication hub allowing the first device 102 to function as part of the communication path 104 and not limited to be an end point or terminal unit to the communication path 104. The communication unit 610 can include active and passive components, such as microelectronics or an antenna, for interaction with the communication path 104.

The communication unit 610 can include a communication interface 620. The communication interface 620 can be used for communication between the communication unit 610 and other functional units in the first device 102. The communication interface 620 can receive information from the other functional units or can transmit information to the other functional units.

The communication interface 620 can include different implementations depending on which functional units are being interfaced with the communication unit 610. The communication interface 620 can be implemented with technologies and techniques similar to the implementation of the controller interface 614.

For illustrative purposes, the navigation system 100 is shown with the partition having the user interface 602, the storage unit 604, the location unit 606, the control unit 608, and the communication unit 610 although it is understood that the navigation system 100 can have a different partition. For example, the software 612 can be partitioned differently such that some or all of its function can be in the control unit 608, the location unit 606, and the communication unit 610. Also, the first device 102 can include other functional units not shown in FIG. 6 for clarity.

The functional units in the first device 102 can work individually and independently of the other functional units. The first device 102 can work individually and independently from the second device 106 and the communication path 104.

Figure 7:
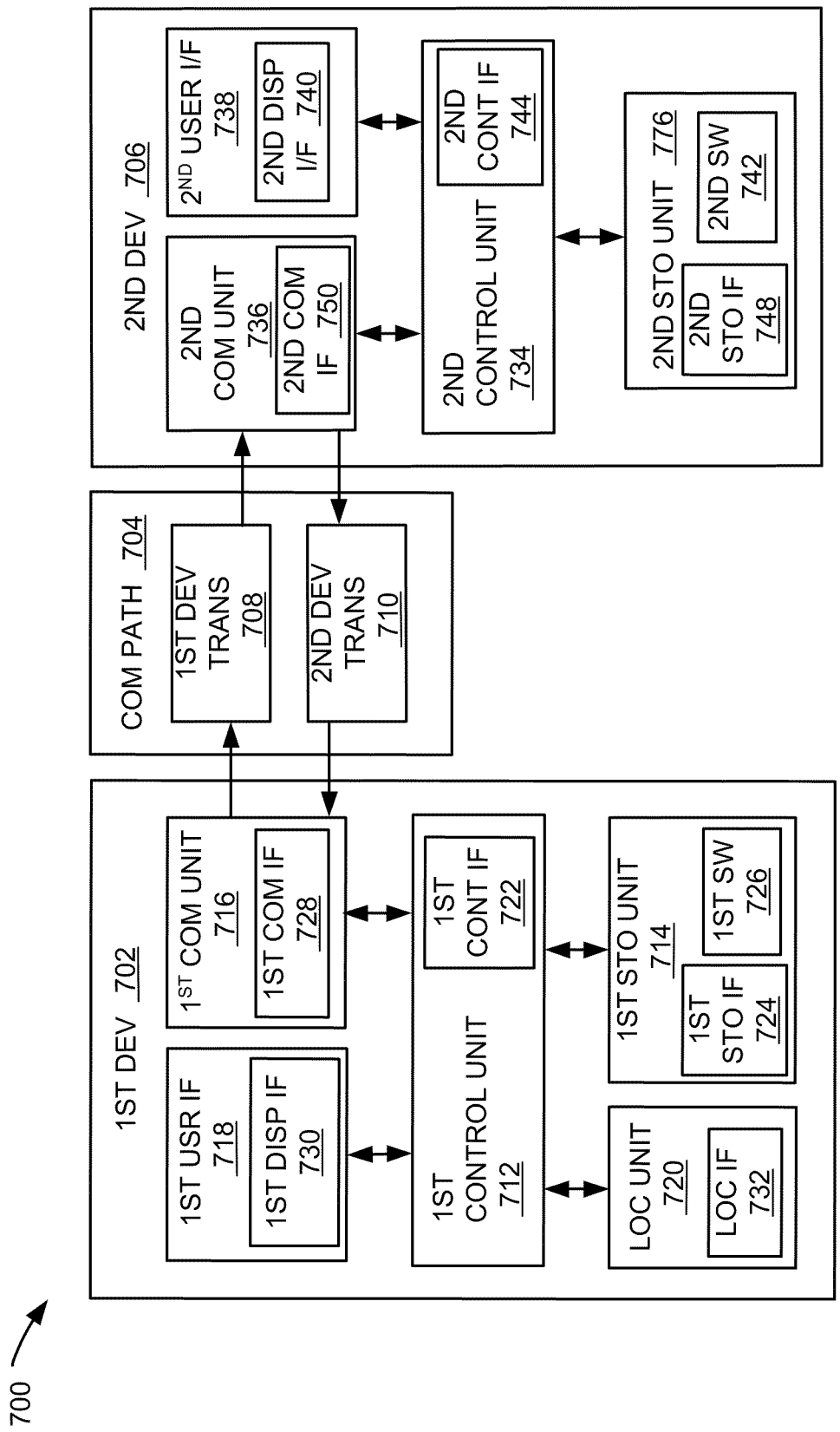
FIG. 7 is an exemplary block diagram of a navigation system in a second embodiment of the present invention.

Referring now to FIG. 7, therein is shown an exemplary block diagram of a navigation system 700 in a second embodiment of the present invention. The navigation system 700 can include a first device 702, a communication path 704, and a second device 706.

The first device 702 can communicate with the second device 706 over the communication path 704. For example, the first device 702, the communication path 704, and the second device 706 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 700.

The first device 702 can send information in a first device transmission 708 over the communication path 704 to the second device 706. The second device 706 can send information in a second device transmission 710 over the communication path 704 to the first device 702.

For illustrative purposes, the navigation system 700 is shown with the first device 702 as a client device, although it is understood that the navigation system 700 can have the first device 702 as a different type of device. For example, the first device 702 can be a server.

Also for illustrative purposes, the navigation system 700 is shown with the second device 706 as a server, although it is understood that the navigation system 700 can have the second device 706 as a different type of device. For example, the second device 706 can be a client device.

For brevity of description in this embodiment of the present invention, the first device 702 will be described as a client device and the second device 706 will be described as a server device. The present invention is not limited to this selection for the type of devices. The selection is an example of the present invention.

The first device 702 can include a first control unit 712, a first storage unit 714, a first communication unit 716, a first user interface 718, and a location unit 720. The first device 702 can be similarly described by the first device 102.

The first control unit 712 can include a first control interface 722. The first control unit 712 and the first control interface 722 can be similarly described as the control unit 608 of FIG. 6 and the controller interface 614 of FIG. 6, respectively.

The first storage unit 714 can include a first storage interface 724. The first storage unit 714 and the first storage interface 724 can be similarly described as the storage unit 604 of FIG. 6 and the storage interface 618 of FIG. 6, respectively. A first software 726 can be stored in the first storage unit 714.

The first communication unit 716 can include a first communication interface 728. The first communication unit 716 and the first communication interface 728 can be similarly described as the communication unit 610 of FIG. 6 and the communication interface 620 of FIG. 6, respectively.

The first user interface 718 can include a first display interface 730. The first user interface 718 and the first display interface 730 can be similarly described as the user interface 602 of FIG. 6 and the display interface 202 of FIG. 2, respectively.

The location unit 720 can include a location interface 732. The location unit 720 and the location interface 732 can be similarly described as the location unit 606 of FIG. 6 and the location interface 616 of FIG. 6, respectively.

The performance, architectures, and type of technologies can also differ between the first device 102 and the first device 702. For example, the first device 102 can function as a single device embodiment of the present invention and can have a higher performance than the first device 702. The first device 702 can be similarly optimized for a multiple device embodiment of the present invention.

For example, the first device 102 can have a higher performance with increased processing power in the control unit 608 compared to the first control unit 712. The storage unit 604 can provide higher storage capacity and access time compared to the first storage unit 714.

Also for example, the first device 702 can be optimized to provide increased communication performance in the first communication unit 716 compared to the communication unit 610. The first storage unit 714 can be sized smaller compared to the storage unit 604. The first software 726 can be smaller than the software 612 of FIG. 6.

The second device 706 can be optimized for implementing the present invention in a multiple device embodiment with the first device 702. The second device 706 can provide the additional or higher performance processing power compared to the first device 702. The second device 706 can include a second control unit 734, a second communication unit 736, and a second user interface 738.

The second user interface 738 allows a user (not shown) to interface and interact with the second device 706. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 700. The second software 742 can operate in conjunction with the first software 726. The second control unit 734 can provide additional performance compared to the first control unit 712 or the control unit 608.

The second control unit 734 can operate the second user interface 738 to display information. The second control unit 734 can also execute the second software 742 for the other functions of the navigation system 700, including operating the second communication unit 736 to communicate with the first device 702 over the communication path 704.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 706. The second controller interface 744 can also be used for communication that is external to the second device 706.

The second controller interface 744 can receive information from the other functional units or from external sources, or can transmit information to the other functional units or to external destinations. The external sources and the external destinations refer to sources and destinations external to the second device 706.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 700 is shown with the second storage unit 746 as a single hierarchy storage system, although it is understood that the navigation system 700 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between the location unit 606 and other functional units in the second device 706. The second storage interface 748 can also be used for communication that is external to the second device 706.

The second storage interface 748 can receive information from the other functional units or from external sources, or can transmit information to the other functional units or to external destinations. The external sources and the external destinations refer to sources and destinations external to the second device 706.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 706. For example, the second communication unit 736 can permit the second device 706 to communicate with the first device 702 over the communication path 704.

The second communication unit 736 can also function as a communication hub allowing the second device 706 to function as part of the communication path 704 and not limited to be an end point or terminal unit to the communication path 704. The second communication unit 736 can include active and passive components, such as microelectronics or an antenna, for interaction with the communication path 704.

The second communication unit 736 can include a second communication interface 750. The second communication interface 750 can be used for communication between the second communication unit 736 and other functional units in the second device 706. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 704 to send information to the second device 706 in the first device transmission 708. The second device 706 can receive information in the second communication unit 736 from the first device transmission 708 of the communication path 704.

The second communication unit 736 can couple with the communication path 704 to send information to the first device 702 in the second device transmission 710. The first device 702 can receive information in the first communication unit 716 from the second device transmission 710 of the communication path 704. The navigation system 700 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 706 can include other functional units not shown in FIG. 7 for clarity.

The functional units in the first device 702 can work individually and independently of the other functional units. The first device 702 can work individually and independently from the second device 706 and the communication path 704.

The functional units in the second device 706 can work individually and independently of the other functional units. The second device 706 can work individually and independently from the first device 702 and the communication path 704.

For illustrative purposes, the navigation system 700 is described by operation of the first device 702 and the second device 706. It is understood that the first device 702 and the second device 706 can operate any of the modules and functions of the navigation system 700. For example, the first device 702 is described to operate the location unit 720, although it is understood that the second device 706 can also operate the location unit 720.

Figure 8:
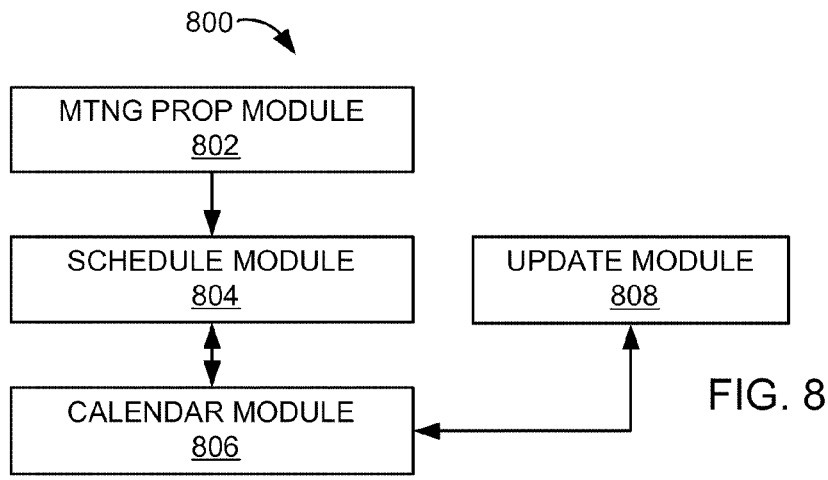
FIG. 8 is a navigation system in a third embodiment of the present invention.

Referring now to FIG. 8, therein is shown a navigation system 800 in a third embodiment of the present invention. The navigation system 800 can include a meeting proposal module 802, a schedule module 804, a calendar module 806, and an update module 808.

The meeting proposal module 802 can be coupled to the schedule module 804. The schedule module 804 can be coupled to the calendar module 806. The update module 808 can also be coupled with the calendar module 806.

The meeting proposal module 802 composes the meeting proposal 402 of FIG. 4. The meeting proposal module 802 can compose the meeting proposal 402 by accepting and grouping the inputs from the user for the meeting proposal 402 of FIG. 4.

The meeting proposal module 802 can accept multiple forms of input. For example, the meeting can be through voice, text, transfer from another device, or the communication path 104 of FIG. 1. The meeting proposal module 802 receives the meeting proposal by a multimodal input. The multimodal input represents multiple input modes to the navigation system 800. The multimodal input can be voice, text, gestures, or from another device. The meeting proposal module 802 can send the meeting proposal 402 to the schedule module 804.

In creating the meeting proposal 402, the meeting proposal module 802 can use the control unit 608 of FIG. 6 and the storage unit 604 of FIG. 6. Also, the meeting proposal module 802 can use the first control unit 712 of FIG. 7 and the first storage unit 714 of FIG. 7.

In sending the meeting proposal 402, the meeting proposal module 802 can use the communication unit 610 of FIG. 6 and send the meeting proposal 402 through the communication path 104. Also, the meeting proposal module 802 can use the first communication unit 716 of FIG. 7 and send the meeting proposal 402 through the communication path 704 of FIG. 7.

After receiving the meeting proposal 402 from the meeting proposal module 802, the schedule module 804 can search the calendar module 806 for conflicts and overlaps. The schedule module 804 sends the meeting proposal 402 to the participant calendar 502 of FIG. 5 and schedules the meeting proposal. The operations for the schedule module 804 will be discussed more in detail below.

The calendar module 806 stores the calendar event 508 of FIG. 5 and other factors related to the calendar event 508. The calendar module 806 can include the participant calendar 502, the travel duration 210 of FIG. 2, the calendar date 504 of FIG. 5 and the time segments 506 of FIG. 5, or the calendar event 508. Furthermore, the calendar module 806 can include other information associated to the calendar event 508, such as the meeting location 206 of FIG. 2 or information about the remote participant 414 of FIG. 4.

The calendar module 806 can also include separate and individual calendars for the user and the remote participant 414 or the calendar event 508 that is shared by multiple users. For example, the calendar module 806 can include a personal calendar, such as Microsoft Outlook™, a reservation system for reserving a conference room, or both.

The calendar module 806 also detects changes made to the participant calendar 502. The calendar module 806 will detect changes to the calendar event 508, such as adding or deleting the calendar event 508 from the participant calendar 502 or lengthening the duration of the calendar event 508. The changes made to the calendar event 508 will be passed onto the schedule module for calculating the participant travel time 224 of FIG. 2 and the subsequent travel time 306 of FIG. 3 and for displaying the calendar warning 510 of FIG. 5.

After detecting the change made to the participant calendar 502, the calendar module 806 can modify the meeting proposal 402 based on the participant status 226. For example, if the user is unable to confirm the meeting proposal 402 or if the participant status 226 renders the meeting proposal 402 unfeasible, the calendar module 806 can notify the user or suggest an alternate time or place for the meeting proposal.

The calendar module 806 confirms the meeting proposal 402 based on the participant status 226 of FIG. 2. The calendar module 806 can confirm the meeting proposal based on the participant status 226 by displaying the participant status 226 and querying the remote participant 414 to accept or reject the meeting proposal 402.

The calendar module 806 can use the control unit 608 or the first control unit 712 to execute the above described functions. The calendar module 806 can also use the storage unit 604 or the second storage unit 746 of FIG. 7 to store the participant calendar 502, the calendar event 508, and the meeting proposal 402.

The update module 808 notifies the user of changes made to the participant calendar 502 or the status of the remote participant 414. The update module 808 can also access the calendar module 806 for updating the user for the calendar event 508 that is upcoming or the status of the remote participant 414. The operations for the update module 808 will be discussed more in detail below.

For illustrative purposes, the modules of the navigation system 800 are described as discrete functional modules, although it is understood that these modules can have a different configuration. For example, the meeting proposal module 802, the calendar module 806, the schedule module 804, and the update module 808 may not be discrete functional modules but may have one or more of the aforementioned modules combined into one functional module.

The navigation system 800 can be partitioned between the first device 702 of FIG. 7 and the second device 706 of FIG. 7. For example, the navigation system 800 can be partition into the functional units of the first device 702, the second device 706, or a combination thereof. The navigation system 800 can also be implemented as additional functional units in the first device 102 of FIG. 1, the first device 702, the second device 706, or a combination thereof.

Figure 9:
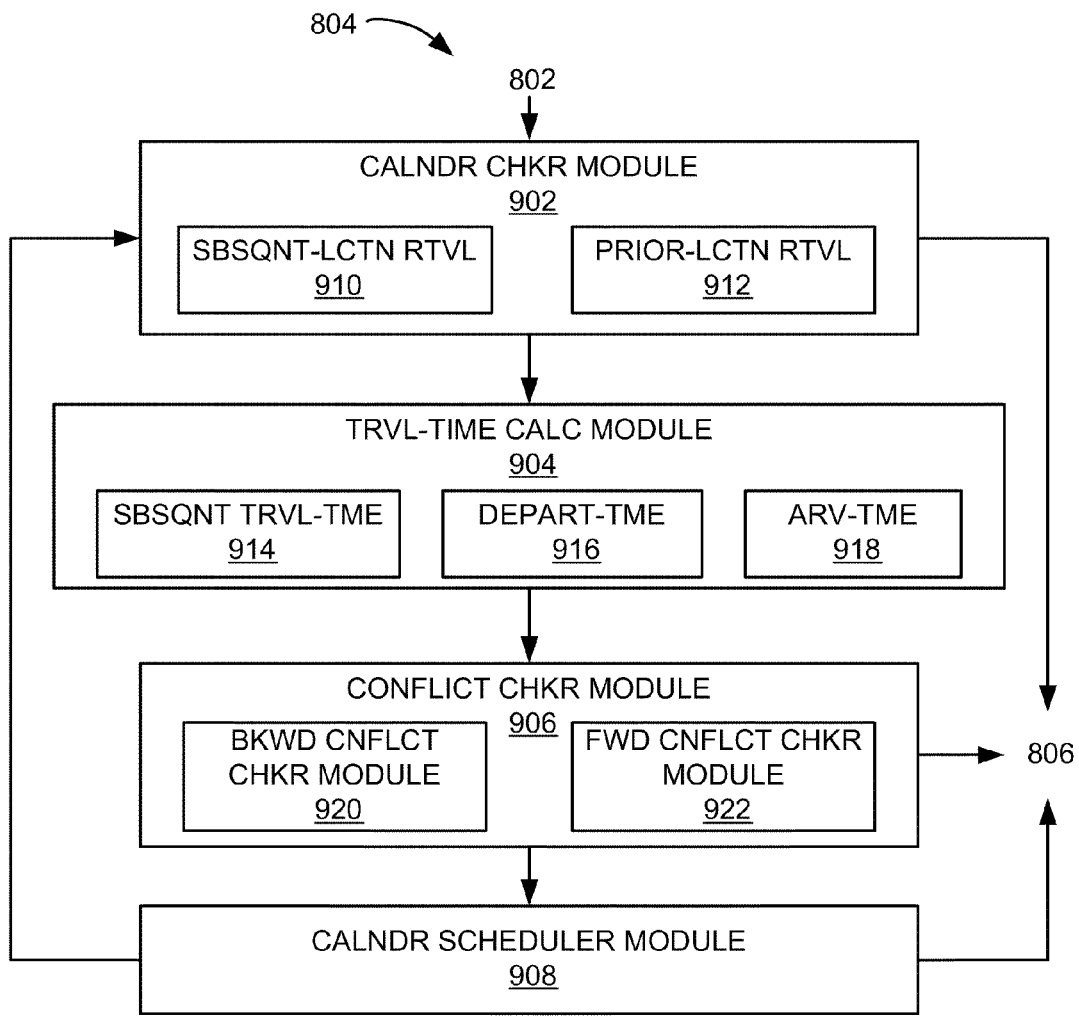
FIG. 9 is a detailed view of the schedule module of FIG. 8.

Referring now to FIG. 9, therein is shown a detailed view of the schedule module 804 of FIG. 8. The schedule module 804 can have a calendar checker module 902, a travel-time calculation module 904, a conflict checker module 906, and a calendar scheduler module 908.

The calendar checker module 902 can be coupled with the meeting proposal module 802 of FIG. 8, the calendar module 806 of FIG. 8, and the travel-time calculation module 904. The travel-time calculation module 904 can further be coupled with the conflict checker module 906. The conflict checker module 906 can further be coupled with the calendar scheduler module 908 and the calendar module 806. The calendar scheduler module 908 can further be coupled with the calendar module 806 and the calendar checker module 902.

The calendar checker module 902 searches the calendar module 806 for the calendar event 508 of FIG. 5. The calendar checker module 902 can receive the meeting proposal 402 of FIG. 4 from the meeting proposal module 802.

The calendar checker module 902 can include a subsequent-location retrieval module 910 and a prior-location retrieval module 912. The subsequent-location retrieval module 910 determines the subsequent calendar event 512 of FIG. 5, having the subsequent location 302 of FIG. 3 and the subsequent meeting time 312 of FIG. 3.

To determine the subsequent location 302, the prior-location retrieval module 912 can search the participant calendar 502 by starting from a desired point in time and going back across time to find the subsequent calendar event 512. The subsequent location 302 specified in the subsequent calendar event 512 can represent where the remote participant 414 of FIG. 4 will be after the meeting times specified in the meeting proposal 402 of FIG. 4.

The prior-location retrieval module 912 determines the prior location 314 of FIG. 3 from the participant calendar 502 of FIG. 5. In determining the prior location 314, the prior-location retrieval module 912 can search the calendar module 806 to find where the remote participant 414 is scheduled to be before the meeting times specified in the meeting proposal 402.

In determining the prior location 314, the prior-location retrieval module 912 can start with the meeting date 406 of FIG. 4 at the meeting start time 214 of FIG. 2 and search backward, across the time segments 506 of FIG. 5, for the prior location 314. The subsequent-location retrieval module 910 can check with the meeting date 406 at the meeting end time 410 of FIG. 4 and search forward, across the time segments 506, to determine the subsequent location 302.

For illustrative purposes, the subsequent-location retrieval module 910 and the prior-location retrieval module 912 are described as determining the prior location 314 or the subsequent location 302 by searching from the times specified in the meeting proposal 402, although it is understood that they can start from a different point in the calendar. For example, the sub-modules of the calendar checker module 902 can start from the meeting location 206 of FIG. 2 first found on the calendar date 504 of FIG. 5 that corresponds to the meeting date 406 and search forward. The sub-modules of the calendar checker module 902 can also start from the last event of the calendar date 504 and search backward.

The calendar checker module 902 can use the control unit 608 of FIG. 6 and the storage unit 604 of FIG. 6. The calendar checker module 902 can also use the second control unit 734 of FIG. 7 and the second storage unit 746 of FIG. 7.

The calendar checker module 902 can send the prior location 314 and the subsequent location 302 to the travel-time calculation module 904. The travel-time calculation module 904 can calculate the participant travel time 224 of FIG. 2, the subsequent travel time 306 of FIG. 3 and the latest departure time 310 of FIG. 3.

The travel-time calculation module 904 calculates the amount of time the remote participant 414 will need to travel to and from the location specified in the meeting proposal 402. The travel-time calculation module 904 can contain a subsequent travel-time module 914, a departure-time module 916, and an arrival-time module 918.

The arrival-time module 918 calculates the participant travel time 224 for traversing between the prior location 314 and the meeting location 206. The arrival-time module 918 can calculate the participant travel time 224 by calculating the time the remote participant 414 will need to arrive at the proposed meeting place. The arrival-time module 918 can be operated based on a change to the participant calendar 502.

The participant travel time 224 is the length of time the remote participant 414 will need to arrive at the meeting location 206. The participant travel time 224 can be calculated based on the participant's travel route 220 of FIG. 2 and other factors, such as the travel condition 222 of FIG. 2 and the participant status 226 of FIG. 2.

For example, the arrival-time module 918 can calculate a length of time needed to traverse the participant's travel route 220 using the distance of the participant's travel route 220 and an average speed associated with the arrival route 208. The arrival-time module 918 can increase or decrease the calculated duration based on the travel condition 222, such as weather forecast or a pattern of delays in the scheduled flight.

The arrival-time module 918 can further increase or decrease the calculated duration based on the participant status 226, such as the remote participant's health or late departure time to calculate the participant travel time 224. The participant travel time 224 can be added to either the current time or the end time of the previous entry of the calendar event 508 to notify the user of when the remote participant 414 will be arriving.

The subsequent travel-time module 914 calculates the subsequent travel time 306 for traversing between the meeting location 206 and the subsequent calendar event 512. The subsequent travel-time module 914 can calculate the subsequent travel time 306 by calculating the time necessary to travel from the location specified in the meeting proposal 402 to the next scheduled meeting or location.

Using the subsequent location 302 of FIG. 3, the subsequent travel-time module 914 can calculate the subsequent travel time 306 for traversing the exit route 304 FIG. 3. For example, the subsequent travel-time module 914 can calculate the subsequent travel time 306 using the distance and average speed of the exit route 304.

The departure-time module 916 calculates the latest time the remote participant 414 must leave proposed meeting in order to arrive at the next meeting on time. The departure-time module 916 can calculate the latest departure time 310 based on the subsequent travel time 306 and the subsequent meeting time 312.

For example, the latest departure time 310 can be calculated by subtracting the subsequent travel time 306 from the subsequent meeting time 312. The departure-time module 916 can add or subtract time to the latest departure time 310 based on the subsequent meeting update 308, such as changes to the subsequent meeting time 312 or changes to the environmental conditions along the exit route 304.

The travel-time calculation module 904 can use the control unit 608 of FIG. 6 and the storage unit 604 of FIG. 6. The travel-time calculation module 904 can also use the second control unit 734 and the second storage unit 746.

For illustrative purposes, the travel-time calculation module 904 and its sub-modules are described as calculating the values based on distance and average speed, then increasing or decreasing the value based on other factors, although it is understood that the travel-time calculation module 904 and its sub-modules can calculate the values differently. For example, the travel-time calculation module 904 and its sub-modules can start with the fastest speed and calculate the shortest time, then increase the values according to other factors such as the subsequent meeting update 308. The calculation can also be done starting with the slowest speed and longest time and decrease the values according to other factors.

Further for illustrative purposes, the travel-time calculation module 904 and its sub-modules are described as calculating values in sequential steps, although it is understood that they can calculate the values differently. For example, the travel-time calculation module 904 and its sub-modules can factor in other factors, such as the subsequent meeting update 308, along with the distance and speed calculation to calculate the desired outputs.

The travel-time calculation module 904 can send the participant travel time 224 and the subsequent travel time 306 to the conflict checker module 906. The conflict checker module 906 determines if the meeting proposal 402 conflicts or overlaps with the calendar event 508 in the participant calendar 502. The conflict checker module 906 also determines if the changes made by the remote participant 414 to the participant calendar 502 conflicts or overlaps with the meeting proposal 402.

The conflict checker module 906 can determine if the calendar event 508 at any time of a day, along with the participant travel time 224 and the subsequent travel time 306, overlaps with the meeting proposal 402. The calendar event 508 overlaps the meeting proposal 402 when the meeting start time 214 or the meeting end time 410 of the calendar event 508 occurs between the travel duration 210 and the subsequent travel time 306.

A conflict occurs when the meeting start time 214 or the meeting end time 410 of the calendar event 508 occurs after the meeting start time 214 minus the travel duration 210, and before the meeting end time 410 plus the subsequent travel time 306. For example, the meeting proposal 402 having 2:30 pm for the meeting start time 214 and 5:00 pm for the meeting end time 410, and having one hour for the travel duration 210 and one hour for the subsequent travel time 306, conflicts with the calendar event 508 that starts or ends between 6:00 pm and 1:30 pm, respectively.

The conflict checker module 906 can contain a backward conflict-checker module 920 and a forward conflict-checker module 922 as sub-modules. The backward conflict-checker module 920 is for scheduling the meeting proposal 402 on the participant calendar 502 based on the participant travel time 224 not exceeding the meeting start time 214 for displaying on a device. The backward conflict-checker module 920 determines whether an overlap or a conflict exists with the calendar event 508 preceding the meeting proposal 402, such as when the participant travel time 224 exceeds the meeting start time 214.

The forward conflict-checker module 922 is for scheduling the meeting proposal 402 on the participant calendar 502 including verifying the subsequent travel time 306 is before the subsequent calendar event 512. The forward conflict-checker module 922 determines whether an overlap or a conflict exists with the calendar event 508 following the meeting proposal 402.

In some cases, the calendar event 508 may be overlappable. The calendar event 508 can coexist with the meeting proposal 402 or the travel times associated with the meeting proposal 402.

For example, the calendar event 508 consisting of the remote participant 414 picking up coffee or making a phone call can be an overlappable event since they can coexist with the participant travel time 224 or the subsequent travel time 306. Also, for example, attending a conference may be overlappable if the meeting proposal 402 occurs at the same location, and a tele-conference may be overlappable with the meeting proposal 402 to pick up groceries.

The conflict checker module 906 can flag the meeting proposal 402 overlaps or conflicts with a non-overlappable calendar event. The conflict checker module 906 schedules the meeting proposal 402 on the participant calendar 502 based on the participant travel time 224 not exceeding the meeting start time 214, including verifying the participant calendar 502 is free of the calendar event 508 of a nonoverlappable type during the participant travel time 224.

Also, the conflict checker module 906 schedules the meeting proposal 402 on the participant calendar 502 based on the participant travel time 224 not exceeding the meeting start time 214, including scheduling the meeting proposal 402 on the participant calendar 502 over the calendar event 508 that is an overlappable type. The conflict checker module 906 can pass the results to the calendar scheduler module 908.

The conflict checker module 906 can use the control unit 608 of FIG. 6 and the storage unit 604 of FIG. 6. The conflict checker module 906 can also use the second control unit 734 and the second storage unit 746.

The calendar scheduler module 908 sends the meeting proposal 402 to the participant calendar 502, with the meeting proposal 402 having the meeting location 206 and the meeting start time 214. When there is no conflict or overlap, or if the user ignores the conflict or the overlap, the calendar scheduler module 908 sends the meeting proposal 402 to the participant calendar 502.

When there is a conflict or an overlap, the calendar scheduler module 908 can notify the user of the details of the conflict or the overlap. The user can change the meeting proposal 402 and restart the process.

Because the calendar scheduler module 908 sends the meeting proposal 402 to the remote participant 414, the meeting proposal 402 is free of overlaps. In sending the meeting proposal 402, the conflict checker module 906 gives the remote participant 414 access to the meeting proposal 402.

The remote participant 414 can view the meeting proposal 402 and finalize the meeting proposal 402 by accepting or rejecting the meeting proposal 402. If the remote participant 414 accepts the meeting proposal 402, the calendar module 806 can schedule the meeting proposal by storing the meeting proposal 402 as the calendar event 508 in the participant calendar 502.

The calendar scheduler module 908 notifies the user of any changes made to the schedule of the remote participant 414. The calendar scheduler module 908 can notify the user through the user interface 602 when the calendar scheduler module 908 finds the calendar event 508 that overlaps the meeting proposal 402, the travel duration 210, or the subsequent travel time 306. The meeting proposal 402 of the overlapping calendar event can be included in the notification. Upon notification, the user can modify the meeting proposal 402 and send the meeting profile again.

When there is no overlap, the calendar scheduler module 908 can query the user and the remote participants through the user interface 602 for confirmation to accept the meeting proposal 402. Once the calendar scheduler module 908 receives such authorization from the user and the remote participant 414 specified in the meeting proposal 402, the proposed meeting can be stored in the calendar module 806 as the calendar event 508 for the user and the remote participant 414.

The calendar scheduler module 908 can use the control unit 608 and the storage unit 604 to execute the above mentioned functions. The calendar scheduler module 908 can also use the second control unit 734 and the second storage unit 746 to execute the same functions. The calendar scheduler module 908 can further utilize the second communication unit 736 of FIG. 7 and the communication path 104 to notify and receive confirmation from the remote participant 414.

Figure 10:
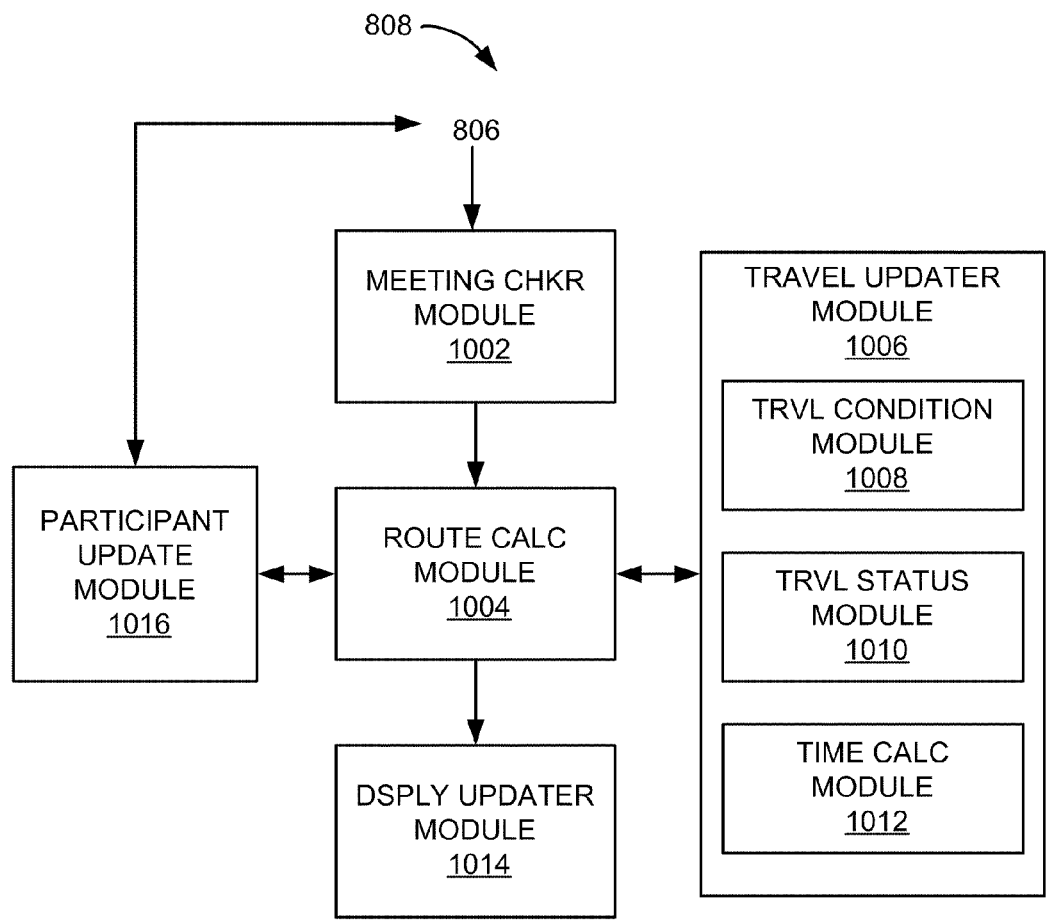
FIG. 10 is a detailed view of the update module of FIG. 8.

Referring now to FIG. 10, therein is shown a detailed view of the update module 808 of FIG. 8. The update module 808 can update the user of the calendar event 508 of FIG. 5 and the relevant information. The update module 808 can notify the user of the current location 204 of FIG. 2 and the calendar event 508 of FIG. 5, along with the meeting location 206 of FIG. 2, the arrival route 208 of FIG. 2, and other factors related to the travel, such as the travel condition 222 of FIG. 2 and the participant status 226 of FIG. 2.

The update module 808 can calculate the subsequent travel time 306 of FIG. 3 based on the exit route 304 of FIG. 3 and the subsequent meeting update 308 of FIG. 3. For example, the update module 808 can calculate average time needed to traverse the exit route 304 using the distance and average speed of the exit route, and increase or decrease the average time based on the subsequent meeting update 308 and the travel note to calculate the subsequent travel time 306.

The update module 808 can include a meeting checker module 1002, a route calculation module 1004, a travel updater module 1006, a display updater module 1014, and a participant update module 1016. The travel updater module 1006 can include a travel condition module 1008, a travel status module 1010, and a time calculation module 1012.

The meeting checker module 1002 can be coupled with the calendar module 806. The meeting checker module 1002 can further be coupled with the route calculation module 1004. The route calculation module 1004 can be coupled with the travel updater module 1006 and the participant update module 1016. The travel updater module 1006 can further be coupled with the display updater module 1014. The participant update module 1016 can be further coupled with the calendar module 806.

The meeting checker module 1002 searches the calendar module for the calendar event. For example, the meeting checker module 1002 can determine where the remote participant 414 of FIG. 4 needs to go after the instant meeting by searching the participant calendar 502 of FIG. 5 for the subsequent calendar event 512 of FIG. 5.

The meeting checker module 1002 can search within the calendar module 806, starting with the current time and date. The meeting checker module 1002 can move forward, across the time segments 506 of FIG. 5, for the subsequent calendar event 512.

The meeting checker module 1002 can use the control unit 608 of FIG. 6 and the storage unit 604 of FIG. 6. The meeting checker module 1002 can also use the second control unit 734 of FIG. 7 and the second storage unit 746 of FIG. 7.

The route calculation module 1004 calculates a route that can be used to travel between the current location 204 and the meeting location 206. The meeting checker module 1002 can pass the calendar event 508 to the route calculation module 1004.

The route calculation module 1004 can calculate the arrival route 208 for the user based on the current location 204 of the user and the meeting location 206. For example, the route calculation module 1004 can calculate the arrival route 208 based on traffic flow, congestion areas, user preference for highways, and whether fastest or shortest by creating an overlay over a continuous route connecting the current location 204 and the meeting location 206.

The travel updater module 1006 updates the status of the remote participant 414 and the various conditions along the suggested travel path. The travel updater module 1006 can receive the arrival route 208 from the route calculation module 1004.

The travel condition module 1008 searches for the current conditions along the suggested travel route of the remote participant 414. The travel condition module 1008 can determine the travel condition 222 to be used to calculate the arrival route 208 and the related time factor. For example, the travel condition module 1008 can detect a storm and determine a 5 day delay or a light traffic condition and 10 minute decrease in travel time.

The travel status module 1010 determines the status of the remote participant 414 in regards to travel. The travel status module 1010 can determine the participant status 226 for the arrival route 208 and the related time factor. For example, the travel status module 1010 can detect a 15 minute delay in departure time or a 1 day delay due to a flight cancellation.

The time calculation module 1012 calculates the time necessary for the remote participant 414 to arrive at the destination. Based on the arrival route 208, the travel condition 222, and the participant status 226, the time calculation module 1012 can calculate the current span for the travel duration 210 of FIG. 2 through a number of ways.

For example, the update module 808 can calculate an average travel time required to traverse from the current location 204 and the meeting location 206 based the distance of the arrival route 208 and the average speed or the speed limit for the arrival route 208. The update module 808 can increase or decrease the average for the travel duration 210 to account for the travel condition 222, then increase or decrease further to account for the participant status 226.

The same calculations can be repeated based on the participant status 226. For example, if the participant status 226 changes, the time calculation module 1012 can re-calculate the relevant times and update the user. The time calculation module 1012 updates the user of the participant travel time 224 to the meeting location 206.

The travel duration 210 can be used to calculate the relative arrival time 216 of FIG. 2. The time calculation module 1012 can add the travel duration 210 to the current time then subtract the meeting start time 214.

The travel updater module 1006 can pass the above referenced information, if any, back to the route calculation module 1004. The passed information, such as the travel condition 222, the participant status 226, the current span for the travel duration 210, the relative arrival time 216, or combination thereof, will be associated with the applicable location along the arrival route 208.

If there are more than one possible route between the current location 204 and the meeting location 206, the route calculation module 1004 can generate multiple routes to pass to the travel updater module 1006 as the arrival route 208. Among the multiple routes, the route calculation module 1004 can select the arrival route 208 based on traffic flow, congestion areas, user preference for highways, and whether fastest or shortest route is preferred, as examples.

Furthermore, the time calculation module 1012 can repeat the calculation when the remote participant 414 makes changes to the calendar event 508 or when there is a change in the status of the remote participant 414. The time calculation module 1012 calculates the participant travel time 224 between the prior location 314 and the meeting location 206 for the meeting proposal 402 based on the change.

The route calculation module 1004 can use the control unit 608, the storage unit 604, the communication unit, the communication path 104, and the location unit 606 of FIG. 6. The route calculation module 1004 can also use the second control unit 734, the second storage unit 746, the second communication unit 736, the communication path 704, and the location unit 720 of FIG. 7.

The travel updater module 1006 can use the control unit 608 and the storage unit 604. The travel updater module 1006 can also use the second control unit 734 and the second storage unit 746.

The display updater module 1014 updates the user by displaying the current location 204, various conditions, and the travel duration 210 of the remote participant 414. The route calculation module 1004 can pass the arrival route 208, along with the associated values such as the travel condition 222, the participant status 226, the current span for the travel duration 210, the relative arrival time 216, or combination thereof to the display updater module 1014. The display updater module 1014 also displays the calendar warning 510 of FIG. 5 when the participant travel time exceeds the meeting start time.

The display updater module 1014 can use the control unit 608, the storage unit 604, and the user interface 602 of FIG. 6. The display updater module 1014 can also use the first control unit 712 of FIG. 7, the first storage unit 714 of FIG. 7, and the first user interface 718 of FIG. 7.

The route calculation module 1004 can also pass the arrival route 208, along with the associated values such as the travel condition 222, the participant status 226, the current period of the travel duration 210, the relative arrival time 216, or combination thereof to the participant update module 1016.

The participant update module 1016 monitors the participant status 226. The participant update module 1016 can update the calendar module 806 of the changes in meeting details or related travel times. For example, the participant update module 1016 can detect an adjustment to a preferred option of the arrival route 208 or notify participants of the subsequent meeting if a meeting runs late.

Furthermore, when a user makes changes to the details of a meeting, the participant update module 1016 can notify other participants for the affected meeting. For example, if a user changes the meeting end time 410 of FIG. 4, the calendar module 806 can pass the changes to the participant update module 1016, and the participant update module 1016 can notify the participants for the affected meeting.

Also for example, if a user schedules a new meeting that overlaps with the existing meeting, the calendar module 806 can pass the changed arrival or departure times of the user to the participant update module 1016. The participant update module 1016 will notify the other participants for the overlapped meeting that the user will be late or will have to leave earlier.

The participant update module 1016 can use the control unit 608, the storage unit 604, the communication unit, the communication path 104, and the location unit 606. The participant update module 1016 can also use the second control unit 734, the second storage unit 746, the second communication unit 736, the communication path 704, and the location unit 720.

The update module 808 can also determine the relevant information for the calendar event 508 based on the subsequent calendar event 512 of FIG. 5. Using the subsequent travel time 306 of FIG. 3, the update module 808 can calculate the latest departure time 310 of FIG. 3. The update module 808 can subtract the subsequent travel time 306 from the meeting start time 214 of the subsequent calendar event 512 to calculate the latest departure time 310. The update module 808 can notify the user of the subsequent travel time 306, the exit route 304, travel note, the subsequent meeting update 308, and the latest departure time 310 through the user interface 602.

The update module 808 can also determine the relevant information for the remote participant 414 of FIG. 4. The update module 808 can determine, calculate, and display the participant's location 218 of FIG. 2, the participant's travel route 220 of FIG. 2, the travel condition 222 of FIG. 2, the participant status 226 of FIG. 2, and the participant travel time 224 of FIG. 2.

For illustrative purposes, the navigation system 800 of FIG. 8 is described with its sub-modules calculations by increasing or decreasing an average speed or time, although it is understood that the navigation system 800 can operate the update module 808 differently. For example, the update module 808 can start with the maximum speed and minimum travel time increase the travel time based on the travel condition 222 and the participant status 226 to calculate the travel duration 210 or the subsequent travel time 306.

Also for illustrative purposes, the navigation system 800 is described with its sub-modules calculations in a sequential method, although it is understood that the navigation system 800 can operate the update module 808 differently. For example, the update module 808 can utilize all the factors simultaneously with each factor assigned a weight value to indicate priority or importance for any of the factors.

It has been discovered that the present invention provides a navigation system with scheduling mechanism for scheduling meetings while accounting for times necessary for traveling to and from the meeting. The accounting of times necessary for both to and from each meeting allows for realistic and efficient time management for the users.

The physical transformation of the travel duration 210 of FIG. 2, the meeting proposal 402 of FIG. 4, the arrival time 212, the participant travel time 224, and the subsequent travel time 306 of FIG. 3, results in movement in the physical world, such as people using the first device 702 or vehicles, based on the operation of the navigation system 800. As the movement in the physical world occurs, the movement itself creates additional information that is converted back to the travel duration 210, the subsequent travel time 306, and the exit route 304 for the continued operation of the navigation system 800 and to continue the movement in the physical world.

Thus, it has been discovered that the navigation system with calendar mechanism of the present invention furnishes important and heretofore unknown and unavailable solutions, capabilities, and functional aspects for scheduling calendar events.

The navigation system 800 describes the module functions or order as an example. The modules can be partitioned differently. For example, the meeting proposal module 802 of FIG. 8 can encompass the schedule module 804 of FIG. 8 or the schedule module 804 can encompass the calendar module 806 of FIG. 8. Each of the modules can operate individually and independently of the other modules.

Figure 11:
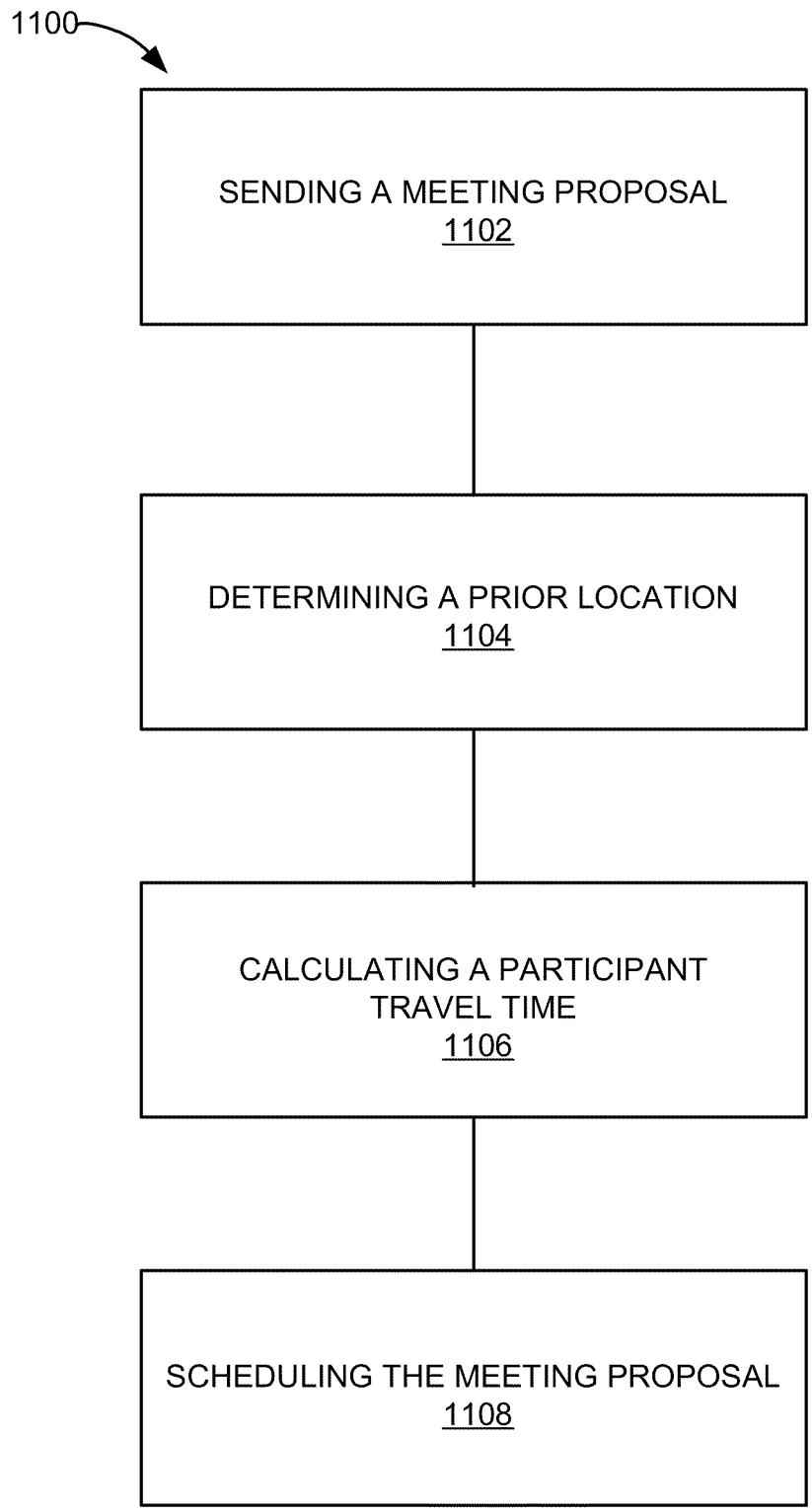
FIG. 11 is a flow chart of a method of operation of a navigation system in a further embodiment of the present invention.

Referring now to FIG. 11, therein is shown a flow chart of a method 1100 of operation of a navigation system in a further embodiment of the present invention. The method 1100 includes: sending a meeting proposal to a participant calendar with the meeting proposal having a meeting location and a meeting start time in a block 1102; determining a prior location from the participant calendar in a block 1104; calculating a participant travel time for traversing between the prior location and the meeting location in a block 1106; and scheduling the meeting proposal on the participant calendar based on the participant travel time not exceeding the meeting start time for displaying on a device in a block 1108.

The resulting method, process, apparatus, device, product, and system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    sending a meeting proposal to a participant calendar for requesting a meeting by a user to a remote participant having the participant calendar, with the meeting proposal having a meeting location and a meeting start time;
    determining a prior location from the participant calendar;
    calculating a participant travel time with a control unit for traversing between the prior location and the meeting location; and
    scheduling the meeting proposal on the participant calendar based on the participant travel time not exceeding the meeting start time for displaying on a device.

2. The method as claimed in claim 1 further comprising:
    determining a subsequent calendar event from the participant calendar with the subsequent meeting having a subsequent location and a subsequent meeting time;
    calculating a subsequent travel time for traversing between the meeting location and the subsequent calendar event; and
    wherein scheduling the meeting proposal on the participant calendar includes:
        verifying the subsequent travel time is before the subsequent calendar event.

3. The method as claimed in claim 1 wherein scheduling the meeting proposal on the participant calendar based on the participant travel time not exceeding the meeting start time includes verifying the participant calendar is free of a calendar event of a nonoverlappable type during the participant travel time.

4. The method as claimed in claim 1 wherein scheduling the meeting proposal on the participant calendar based on the participant travel time not exceeding the meeting start time includes scheduling the meeting proposal on the participant calendar over the calendar event that is an overlappable type.

5. The method as claimed in claim 1 further comprising:
    detecting a change in the participant calendar;
    calculating the participant travel time between the prior location and the meeting location for the meeting proposal based on the change; and
    displaying a calendar warning when the participant travel time exceeds the meeting start time.

6. A method of operation of a navigation system comprising:
    sending a meeting proposal to a participant calendar for requesting a meeting by a user to a remote participant having the participant calendar, with the meeting proposal having a meeting location and a meeting start time;
    determining a prior location from the participant calendar;
    calculating a participant travel time with a control unit for traversing between the prior location and the meeting location;
    determining a subsequent calendar event from the participant calendar with the subsequent meeting having a subsequent location and a subsequent meeting time;
    calculating a subsequent travel time for traversing between the meeting location and the subsequent calendar event;
    scheduling the meeting proposal on the participant calendar based on the participant travel time not exceeding the meeting start time for displaying on a device; and
    verifying the subsequent travel time is before the subsequent meeting time.

7. The method as claimed in claim 6 further comprising:
    monitoring a participant status; and
    confirming the meeting proposal based on the participant status.

8. The method as claimed in claim 6 further comprising monitoring a participant status; and
    modifying the meeting proposal based on the participant status.

9. The method as claimed in claim 6 further comprising monitoring a participant status; and
    updating the participant travel time to the meeting location based on the participant status.

10. The method as claimed in claim 6 further comprising receiving the meeting proposal by a multimodal input.

11. A navigation system comprising:
    a calendar scheduler module for sending a meeting proposal to a participant calendar for requesting a meeting by a user to a remote participant having the participant calendar, with the meeting proposal having a meeting location and a meeting start time;
    a calendar checker module, coupled to the calendar scheduler module, for determining a prior location from the participant calendar;
    a travel-time calculation module, coupled to the calendar checker module, for calculating a participant travel time with a control unit for traversing between the prior location and the meeting location; and
    a conflict checker module, coupled to the travel-time calculation module, for scheduling the meeting proposal on the participant calendar based on the participant travel time not exceeding the meeting start time for displaying on a device.

12. The system as claimed in claim 11 wherein:
    the travel-time calculation module includes:
        a prior-location retrieval module for determining a subsequent calendar event from the participant calendar with the subsequent meeting having a subsequent location and a subsequent meeting time, and
        a subsequent travel-time module for calculating a subsequent travel time for traversing between the meeting location and the subsequent calendar event; and
    the conflict checker module includes:
        a forward conflict-checker module for verifying the subsequent travel time is before the subsequent calendar event.

13. The system as claimed in claim 11 wherein the conflict checker module is for verifying the participant calendar is free of the calendar event of a nonoverlappable type during the participant travel time.

14. The system as claimed in claim 11 wherein the conflict checker module is for scheduling the meeting proposal on the participant calendar over the calendar event that is an overlappable type.

15. The system as claimed in claim 11 further comprising:
a calendar module, coupled to the calendar scheduler module, for detecting a change in the participant calendar;
a display updater module, coupled to the calendar module, for displaying a calendar warning when the participant travel time exceeds the meeting start time; and
wherein the travel-time calculation module includes:
an arrival-time module, coupled to the calendar module, for searching the calendar module for the calendar event.

16. The system as claimed in claim 11 wherein the travel-time calculation module includes:
a prior-location retrieval module for determining a subsequent calendar event from the participant calendar with the subsequent meeting having a subsequent location and a subsequent meeting time; and
a subsequent travel-time module for calculating a subsequent travel time for traversing between the meeting location and the subsequent calendar event.

17. The system as claimed in claim 16 further comprising:
a participant update module, coupled to the calendar module, for monitoring a participant status; and
wherein:
the calendar module is for confirming the meeting proposal based on the participant status.

18. The system as claimed in claim 16 further comprising:
a participant update module, coupled to the calendar module, for monitoring a participant status; and
wherein:
a calendar module, coupled to the calendar scheduler module, for modifying the meeting proposal based on the participant status.

19. The system as claimed in claim 16 further comprising:
a participant update module, coupled to the calendar module, for monitoring a participant status; and
a time calculation module, coupled to the calendar module, is for updating the participant travel time to the meeting location based on the participant status.

20. The system as claimed in claim 16 further comprising a meeting proposal module for receiving the meeting proposal by a multimodal input.

* * * * *